(12) United States Patent
Porte et al.

(10) Patent No.: US 7,961,097 B2
(45) Date of Patent: Jun. 14, 2011

(54) RFID BASED MONITORING SYSTEM AND METHOD

(75) Inventors: Philippe Porte, Aix En Provence (FR); Pierre Bonnefoy, Ceyreste (FR)

(73) Assignee: Psion Teklogix, Inc., Ontario (CA)

( * ) Notice: Subject to any disclaimer, the term of this patent is extended or adjusted under 35 U.S.C. 154(b) by 515 days.

(21) Appl. No.: 11/608,152

(22) Filed: Dec. 7, 2006

(65) Prior Publication Data
US 2008/0136634 A1 Jun. 12, 2008

(51) Int. Cl.
*G08B 13/14* (2006.01)
(52) U.S. Cl. ............ 340/572.1; 340/568.1; 235/375
(58) Field of Classification Search ..... 340/572.1–572.9, 340/568.1–568.8; 235/375–385
See application file for complete search history.

(56) References Cited

U.S. PATENT DOCUMENTS

| | | | | |
|---|---|---|---|---|
| 5,072,213 A | * | 12/1991 | Close | 340/568.2 |
| 5,682,142 A | * | 10/1997 | Loosmore et al. | 340/572.1 |
| 6,018,299 A | | 1/2000 | Eberhardt | |
| 6,259,367 B1 | * | 7/2001 | Klein | 340/572.1 |
| 6,674,368 B2 | * | 1/2004 | Hawkins et al. | 340/573.4 |
| 6,816,076 B2 | * | 11/2004 | Pomes | 340/572.1 |
| 7,242,306 B2 | * | 7/2007 | Wildman et al. | 340/573.1 |
| 7,286,158 B1 | * | 10/2007 | Griebenow | 348/156 |
| 7,336,182 B1 | * | 2/2008 | Baranowski et al. | 340/572.1 |
| 7,439,863 B2 | * | 10/2008 | Suzuki et al. | 340/572.7 |
| 2007/0222595 A1 | * | 9/2007 | Motteram et al. | 340/572.1 |

FOREIGN PATENT DOCUMENTS

| | | |
|---|---|---|
| CN | 1315027 | 6/1999 |
| WO | 2006072769 | 7/2001 |

* cited by examiner

*Primary Examiner* — George A Bugg
*Assistant Examiner* — Edny Labbees
(74) *Attorney, Agent, or Firm* — Brinks Hofer Gilson & Lione

(57) ABSTRACT

An RFID based monitoring system and method is provided. A tag module is allocated to an item to be traced, which is operable by an RFID reader. In the system, the tag module is accessed through conductive coupling with an entry point that is operable in an RF field of the RFID reader.

31 Claims, 15 Drawing Sheets

Upper side

Lower side

RFID BASED MONITORING SYSTEM AND METHOD

FIELD

The present disclosure relates to Radio Frequency Identification (RFID) technology, and more specifically to RFID based monitoring system and method.

BACKGROUND

The statements in this section merely provide background information related to the present disclosure and may not constitute prior art. The process of tracking items requires that each item have its own readable information. Conventionally, each item is marked locally with a visible serial number, which is printed on a label, or is used with a bar code having a machine-readable serial number. Such serial numbers may be correctly read when the items are located so that the serial numbers on the items can be visually observed or be scanned by a bar code scanner. However, manual reading may introduce errors. Further, the items may be in a shield boundary (e.g., cabinet) and are not easily accessible from outside. In this case, it is necessary to open the boundary to read the serial number on each item.

Radio frequency identification (RFID) tags function as contactless markers. Each RFID tag has its own unique identification or identifier (ID). The IDs on the RFID tags are read by an RFID reader using RF signals, and can be used for inventory purpose. Items having the RFID tags can be tracked using the IDs of the tags. The RFID tags can be either active or passive RFID tags. An active RFID tag is used in a variety of applications since the active RFID tag has its own internal power source. However, the size and cost for the active RFID tag is high. In addition, when tracking items in the shield boundary, there is no way to know how many active RFID tags will answer to the RFID reader. Moreover, there may be a confusion between the items supposed to be read and the IDs obtained. The operator of the RFID reader may not know the items in the boundary. The operator may not know where the items are in the boundary.

Therefore, there exists a need for a method and system to improve the access to the item's ID. There is also a need for a method and system to improve the time to scan/read the ID among multiple IDs for inventory purpose.

SUMMARY

Provided is a method and system that obviates or mitigates at least one of the disadvantages/limitations of existing systems.

In accordance with various embodiments of the present disclosure, there is provided a system for monitoring one or more than one item. The system includes an entry point operable in an RF field of an RFID reader, and a connection system for accessing one or more marker tag allocated to the one or more than one item, respectively, through conducive coupling. Each of the one or more than one marker tag includes a unique ID and is operable by the RFID reader. The connection system is conductively coupled with the entry point so that the marker tag is readable through the conductive coupling.

Also provided is a system for monitoring an item. The system includes a tag module having a unique ID and a first antenna. The tag module is operable by an RFID reader. The system includes a second antenna for accessing the tag module. The second antenna is conductively coupled with an entry point operable in an RF field of the RFID reader. The second antenna is inductively coupled with the first antenna so that the tag module is readable through the conductive coupling.

Further, there is provided a method of monitoring one or more than one item. The method includes allocating one or more marker tag to the one or more than one item, respectively. Each of the one or more than one marker tag includes a unique ID and is operable by an RFID reader. The method includes accessing the one or more than one marker tag through conductive coupling. The step of accessing includes conductively coupling an entry point operable by the RFID reader with a connection system for accessing the one or more than one marker tag, and reading the one or more than one marker tag with the RFID reader through the entry point.

This summary of the present disclosure does not necessarily describe all features of the present disclosure.

BRIEF DESCRIPTION OF DRAWINGS

The drawings described herein are for illustration purposes only and are not intended to limit the scope of the present disclosure in any way. These and other features of the invention will become more apparent from the following description in which reference is made to the appended drawings wherein.

DETAILED DESCRIPTION

Figure 1:
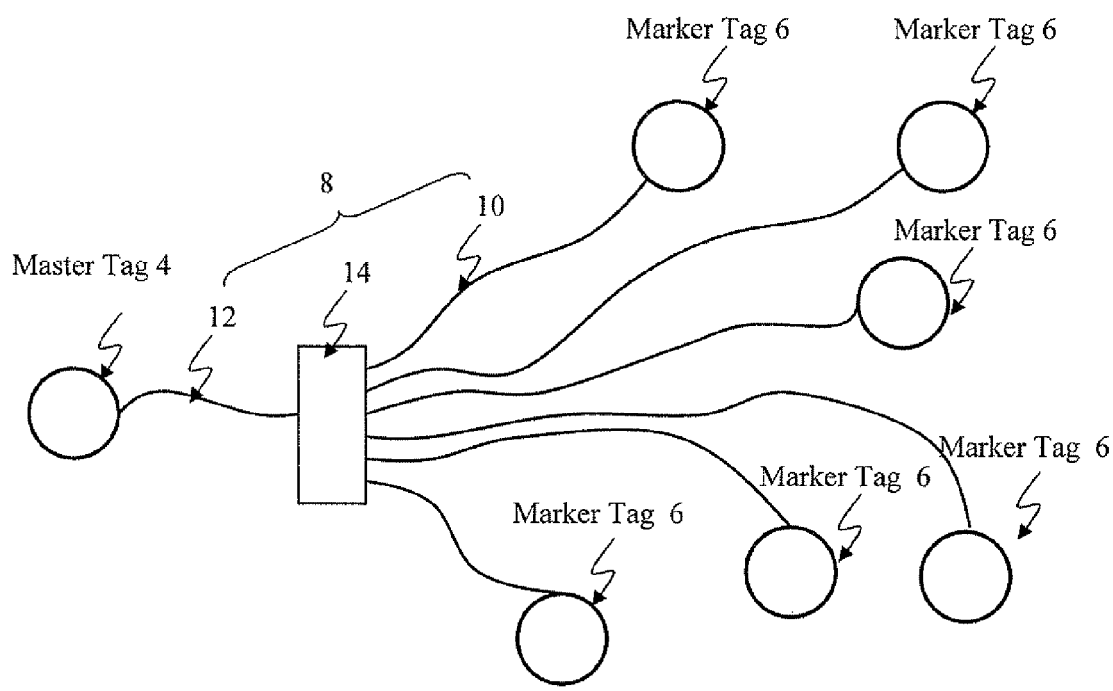
FIG. 1 is a schematic diagram illustrating an example of a monitoring system in accordance with various embodiments of the present disclosure.

The following description is merely exemplary in nature and is not intended to limit the present disclosure, application, or uses. It should be understood that throughout the drawings, corresponding reference numerals indicate like or corresponding parts and features.

FIG. 1 illustrates an example of a monitoring system 2 in accordance with one of various embodiments of the present disclosure. The system 2 includes a master tag 4 and a group of marker tags 6. The marker tag 6 is a tag containing a unique ID. The marker tag 6 is applied to an item that is to be traced. The master tag 4 is an entry point providing access to a group of marker tags 6, through the RF field of an RFID reader. In the description, the terms "monitor", "track" and "trace" may be used interchangeably. In the description, "6" may represent "(individual) marker tag" or "marker tags".

Each marker tag 6 is physically connected to the master tag 4 via a wired connection system 8. The wired connection system 8 is a conductive-coupling module for coupling between the master tag 4 and the marker tags 6. In the description, the terms "connect (or connected)", "couple (or coupled)" and "link (linked)" may be used interchangeably, and may indicate that two or more elements are directly or indirectly in contact with each other.

The wired connection system 8 includes a cable 10 that is detachably connected to the marker tag 6. The wired connection system 8 may include a connection module 14 for dispatching signals on the marker tags 6. The connection module 14 may be a junction box (e.g., 14 Å of FIGS. 4, 6 and 8). The junction box allows grouping all the connexions of the marker tags 6 to the single master tag 4.

The wired connection system 8 may further include a cable 12 for connecting the master tag 4 to the connection module 14. However, in another example, the master tag 4 may be directly wired-connected to the marker tag 6 without using the connection module 14.

The cable 10 may be a twisted pair cable or a coax cable. The cable 12 may be a twisted pair cable or a coax cable. The coax cable provides a long distance wired communication line for tags.

Figure 4:
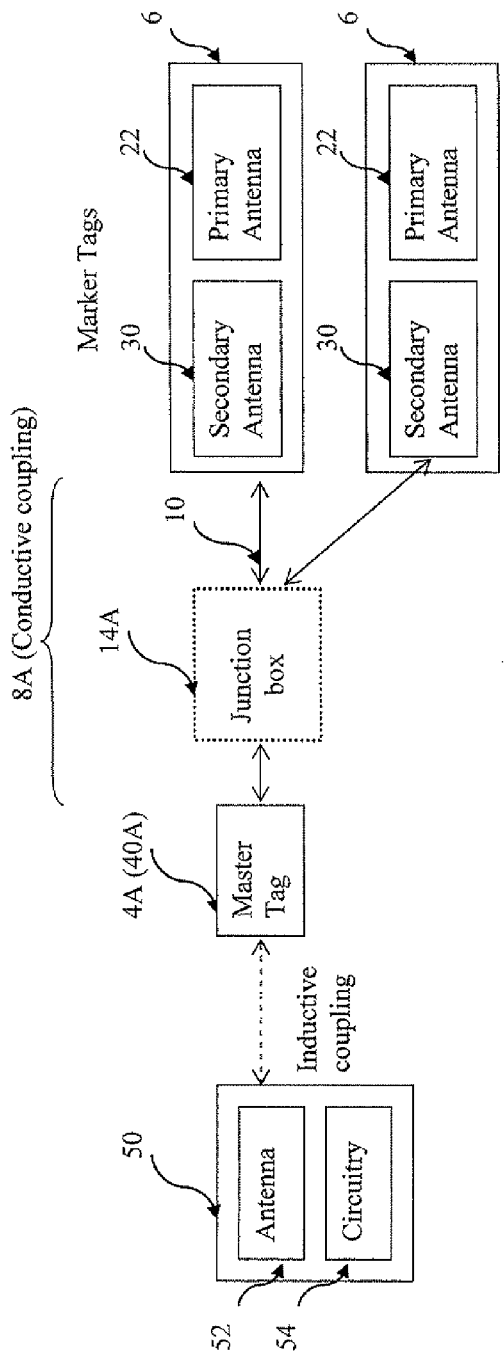
FIG. 4 is a schematic diagram illustrating an example of a coupling among an RFID reader, the master tag and the marker tag.
Figure 6:
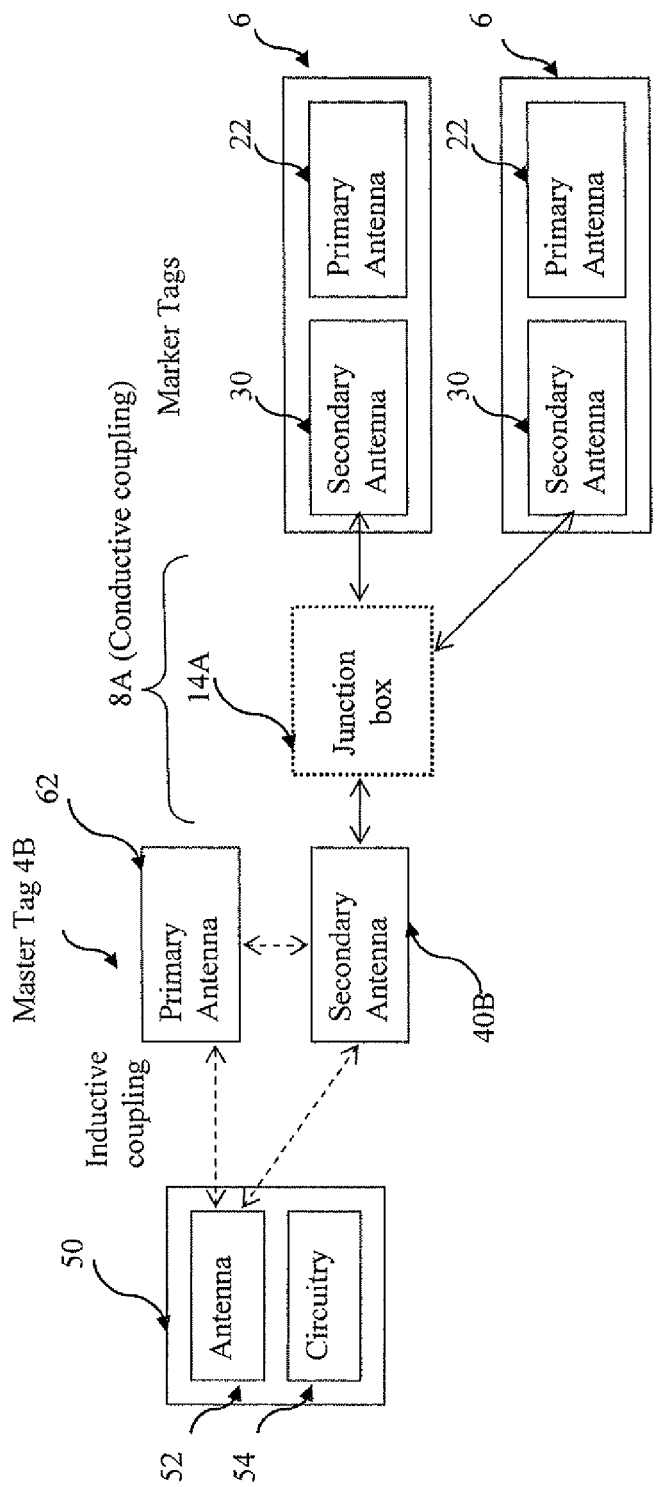
FIG. 6 is a schematic diagram illustrating another example of the coupling among the RFID reader, the master tag and the marker tag.
Figure 8:
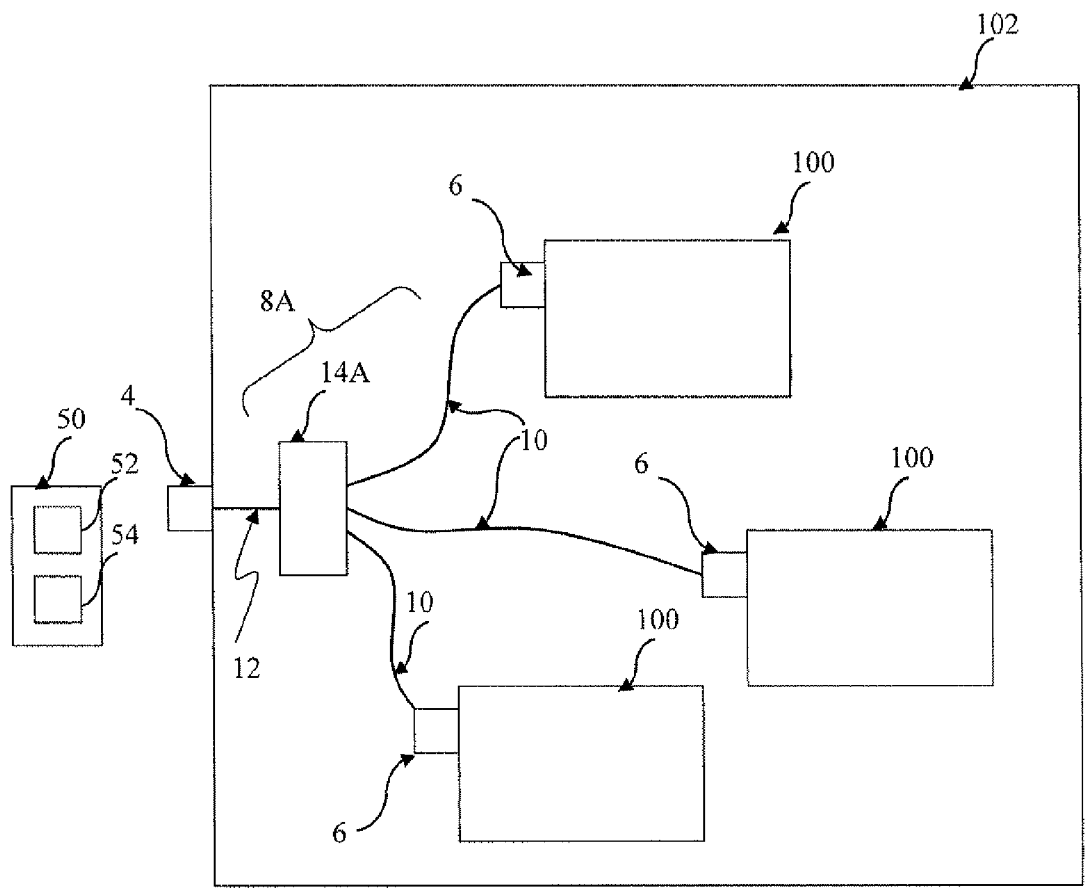
FIG. 8 is a schematic diagram illustrating an exemplary scenario applied to the system of FIG. 1.

The master tag 4 is operable in the RF field of the RFID reader (e.g., 50 of FIGS. 4, 6, and 8). When the master tag 4 is within the RF field of the RFID reader, the marker tags 6 are activated through the wired connection system 8. Data signals output from the RFID reader are transferred to the master tag 4, and then to the marker tags through the wired connection system 8. The marker tag 6 contains readable or readable/writable information (e.g., ID, information associated with an item to be tracked). The information read from the marker tag 6 is transmitted to the master tag 4 through the wired connection system 8.

The system 2 allows for an automatic "on the fly" reading of the information stored in the marker tag 6 through the master tag 4. In addition, the marker tags 6 are repaired through the master tag 4. Information stored in the marker tag 6 is replaced through the master tag 4. The marker tags 6 are controlled through the single entry point, i.e., the master tag 4.

For example, the marker tags 6 may be used to tag items in an enclosure (e.g., a container, a box), which are not easily accessible from outside of the enclosure. In this case, the master tag 4 is located at a place where it is easily readable, and is used to collect information from the marker tags 6. The marker tag 6 and the corresponding item are immediately checked and tracked through the master tag 4. The marker tag 6 is detachable connected to the wired connection system 8. Thus, the item and its marker tag can be easily replaced with a new item and its new tag, respectively.

In FIG. 1, six marker tags 6 are shown. However, the number of the marker tags 6 is not limited to six and may vary in dependence upon the system design or requirements. In FIG. 1, one master tag 4 is shown. However, the number of the master tag 4 is not limited to one and may vary in dependence upon the system design or requirements. In another example, one master tag 4 may be connected to one marker tag 6 in a one to one relationship.

Figure 2:
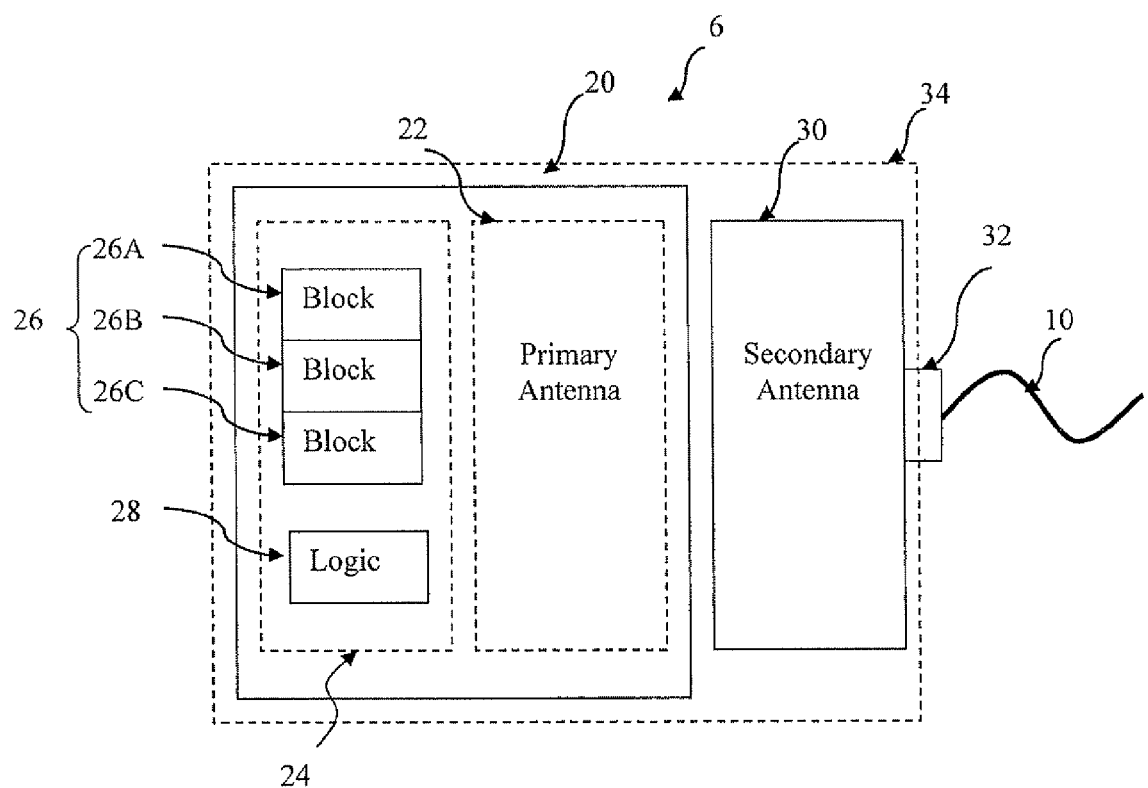
FIG. 2 is a schematic diagram illustrating an example of a marker tag of FIG. 1.

The marker tag 6 of FIG. 1 is described in detail. FIG. 2 illustrates an example of the marker tag 6 of FIG. 1. Referring to FIG. 2, the marker tag 6 includes a tag module 20. The tag module 20 includes an antenna system having a primary antenna 22 and a chip 24. The primary antenna 22 may be a coil antenna. The chip 24 has a unique address and can be addressed uniquely through a tag protocol. The tag module 20 is accessed through the primary antenna 22.

The marker tag 6 further includes a secondary antenna 30. The secondary antenna 30 may be a coil antenna. The secondary antenna 30 may be same or similar to the primary antenna 22. The secondary antenna 30 is connected to the cable 10. The secondary antenna 30 is located physically near the primary antenna 22, however, not electrically connected to the primary antenna 22.

The primary antenna 22 and the secondary antenna 30 are inductively coupled, and have functionality similar to a voltage transformer. The primary antenna 22 and the secondary antenna 30 are positioned so that the magnetic field crossing one of the antennas will cross in the same manner the other antenna. The secondary antenna 30 turns on the resonant frequency same as that of the primary antenna 22. All energy/signals can be transfer from one of the antennas to the other antenna.

The tag module 20 communicates with RFID readers (e.g., 50 of FIGS. 4, 6, and 8) using the cable 10. The tag module 20 may commutate with the RFID readers using RF signals through the secondary antenna 30, the primary antenna 22 or a combination thereof. For communications between an RFID reader and the marker tag 6, "Tag-Talks-First (TTF)" protocol or "Reader-Talks-First (RTF)" protocol may be used. The tag module 20 employs a standard design of RFID circuit and operates in accordance with ISO tag standards, such as ISO 15693 protocols.

The tag module 20 is a passive RFID tag. The tag module 20 derives its energy based on signals received through the cable 10 or signals directly received by the marker tag 6 (e.g., the primary antenna 22, the secondary antenna 30).

The tag module 20 may be an RFID read tag or an RFID read/write tag, which is operable by the RFID readers. The chip 24 includes a memory 26 and a logic section 28 for reading from the memory 26 or reading and writing to the memory 26. The memory 26 includes a plurality of memory blocks, each of which is selectively readable or readable and writeable. In FIG. 2, three memory blocks 26A, 26B and 26C are shown. However, the number of the memory blocks may vary in dependence upon the system design. The memory 26 may include one memory block. The memory 26 stores a unique ID that is used as the tag's unique address. An RFID reader uses the unique ID allocated to the marker tag 6 to identify that tag or an item to which the tag is affixed, and to select the tag. The memory 26 may further store data, such as time dependent information (e.g., date) and information on the item or tag (e.g., configuration).

The memory 26 may include a Read-Only Memory (ROM), a Random Access Memory (RAM) and a Non-Volatile Programmable Memory. The Non-Volatile Programmable Memory may take various forms, e.g., Electrically Erasable Programmable Read Only Memory (EEPROM).

In FIG. 2, the primary antenna 22 and the chip 24 are shown separately from each other. However, the primary antenna 22 and the chip 24 may be integrated into one circuit board and may be in physical or electrical or magnetic contact with each other. In FIG. 2, the memory 26 and the logic section 28 are shown separately from each other. However, the memory 26 and the logic section 28 may be integrated into one single integrated circuit.

The secondary antenna 30 is connected to the cable 10 through a connector 32. The connector 32 is attached to the cable 10. The marker tag 6 is detachably connected to the connector 32 so that the marker tag 6 can be easily separated from the connector 32 and may be replaced with a new marker tag. In order for the replacement, an operator plugs the connector 32 to the new marker tag 6. In another example, the secondary antenna 30 may be directly connected to the cable 10 without using the connector 32.

The tag module 20 and the secondary antenna 30 are in a package 34, and form a single module. However, in another example, the secondary antenna 30 may be provided separately from the tag module 20 and be located outside the package 34.

Figure 3:
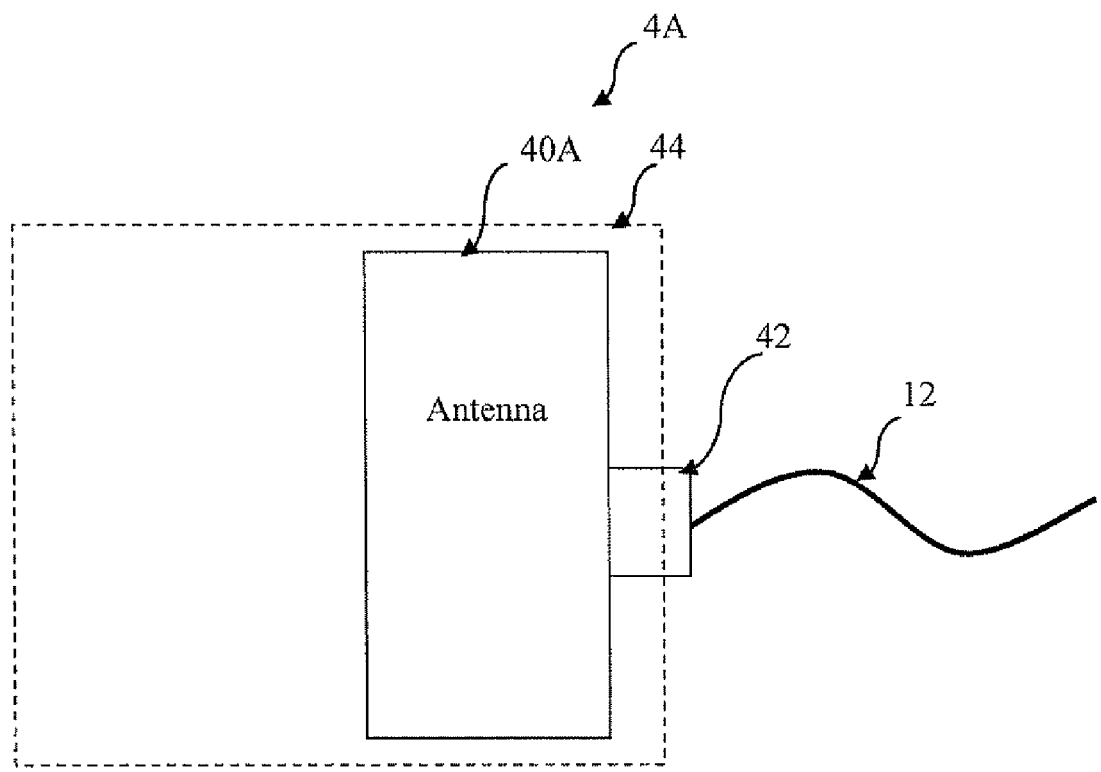
FIG. 3 is a schematic diagram illustrating an example of a master tag of FIG. 1.
Figure 5:
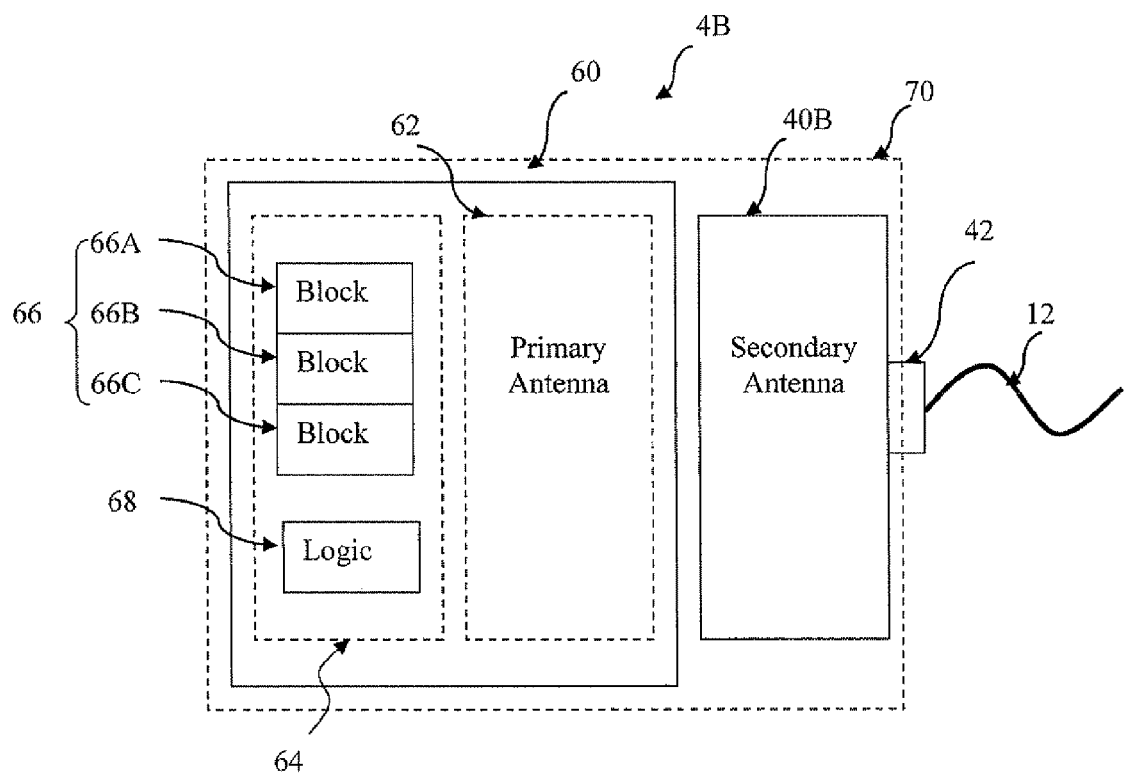
FIG. 5 is a schematic diagram illustrating another example of the master tag of FIG. 1.

The master tag 4 of FIG. 1 is described in detail. The master tag 4 includes an antenna connected to the cable 12, and may have no RF tag function (FIG. 3). The master tag 4 may include a full standard RFID tag in addition to the antenna (FIG. 5).

FIG. 3 illustrates an example of the master tag 4 of FIG. 1. The master tag 4A of FIG. 3 includes an antenna 40A. The antenna 40A is coupled with the cable 12 through a connector 42. The connector 42 may be same or similar to the connector 32 of FIG. 2. The master tag 4A may be detachably connected to the connector 42. In another example, the master tag 4A may be directly connected to the cable 12. The antenna 40A may be on a Printed Circuit Board (PCB) or in a package (44). The antenna 40A may be a coil antenna. The antenna 40A may be same or similar to the secondary antenna 30 of FIG. 2.

FIG. 4 illustrates an example of a coupling among an RFID reader, the master tag 4A and the marker tag 6. The RFID reader 50 of FIG. 4 includes an antenna 52 for communicating with tags and reader circuitry 54. The antenna 52 may be a coil antenna. The RFID reader 50 may include a battery and the antenna 52 may be battery powered. The RFID reader 50 implements read operations on tags. The RFID reader 50 may implement write operations on the tags. The antenna 40A of the master tag 4A is inductive-coupled with the RFID reader antenna 52. In the description, "antenna 52" and "RFID reader antenna 52" are used interchangeably.

The marker tags 6 communicate with the master tag 4A through a wired connection system 8A. The wired connection system 8A corresponds to the wired connection system 8 of FIG. 1 and includes a junction box 14A. The junction box 14A corresponds to the connection module 14 of FIG. 1. The junction box 14A may be a pure connecting box, or may be made of electronic components (e.g., capacitors and inductors), to split the signal into several channels, for each marker tag 6. The junction box 14A is a passive device, which can be seen as a signal splitter.

In FIG. 4, two marker tags 6 are shown. However, the number of the marker tags 6 is not limited to two and may vary in dependence upon the system design or requirements. In FIG. 4, one master tag 4A is shown. However, the number of the master tag 4A is not limited to one and may vary in dependence upon the system design or requirements. The system may include a plurality of master tags 4A, each being coupled with a different group of marker tags 6.

The RFID reader antenna 52 creates an electromagnetic field. When the master tag 4A is located within the electromagnetic field, the marker tag 6 is activated (powered up) through the wired connection system 8A (conductive-coupling). Based on the outputs from the RFID reader 50, High Frequency (HF) signals are circulated from the master tag 4A to the secondary antenna 30 of each marker tag 6. Data signals from the RFID reader 50 are transmitted to the marker tag 6 through the wired connection system 8A. Information read from the tag module (20 of FIG. 3) of the marker tag 6 is transmitted through the wired connection system 8A to the master tag 4A. The master tag 4A is coupled with the RFID antenna 52. Thus, the RFID reader 50 receives the information read from the marker tag 6 through the master tag 4A.

In FIG. 4, the marker tag 6 communicates with the RFID reader 50 using the master tag 4A. However, the marker tag 6 may directly communicate with the RFID reader 50. In FIG. 4, the master tag 4A is connected to the marker tag 6 through the junction box 14A. However, the master tag 4A may be directly connected to the marker tag 6.

FIG. 5 illustrates another example of the master tag 4 of FIG. 1. The master tag 4B of FIG. 5 includes a secondary antenna 40B and a tag module 60. The secondary antenna 40B may be same or similar to the antenna 40A of FIG. 3, and may be a coil antenna. The tag module 60 may be same or similar to the tag module 20 of FIG. 2. The tag module 60 includes an antenna system having a primary antenna 62 and a chip 64. The primary antenna 62 may be same or similar to the primary antenna 22 of FIG. 2, and may be a coil antenna. The chip 64 may be same or similar to the chip 24 of FIG. 2. The chip 64 has a unique address and can be addressed uniquely through a tag protocol. The tag module 60 is accessed through the primary antenna 62.

The secondary antenna 40B is located physically near the primary antenna 62 to implement inductive-coupling, however, not electrically connected to the primary antenna 62. The primary antenna 62 and the secondary antenna 40B have functionality similar to a voltage transformer. The primary antenna 62 and the secondary antenna 40B are positioned so that the magnetic field crossing one of the antennas will cross in the same manner the other antenna. The secondary antenna 40B turns on the resonant frequency same as that of the primary antenna 62. All energy/signals can be transfer from one of the antennas to the other antenna.

The tag module 60 may be an RFID read tag or an RFID read/write tag, which is operable by RFID readers (e.g., 50 of FIGS. 4, 6, and 8). The tag module 60 may be a passive tag or an active tag that includes a battery.

The chip 64 includes a memory 66 and a logic section 68 for reading from the memory 66 or reading and writing to the memory 66. The memory 66 includes a plurality of memory blocks, each of which is selectively readable or readable and writeable. In FIG. 5, three memory blocks 66A, 66B and 66C are shown. However, the number of the memory blocks may vary in dependence upon the system design. The memory 66 may include one memory block. The memory 66 stores a unique ID that is used as the tag's unique address. An RFID reader uses the unique ID allocated to the master tag 4B to identify that tag or an item to which the tag is affixed, and to select the tag. The memory 66 may further store data, such as time dependent information (e.g., date) and information on the item or tag (e.g., configuration).

The tag module 60 may communicate with RFID readers directly through the primary antenna 62 or through the secondary antenna 40B. For communications between an RFID reader and the tag module 60, "Tag-Talks-First (TTF)" protocol or "Reader-Talks-First (RTF)" protocol may be used. The tag module 60 employs a standard design of RFID circuit and operates in accordance with ISO tag standards, such as ISO 15693 protocols.

In FIG. 5, the primary antenna 62 and the chip 64 are shown separately from each other. However, the primary antenna 62 and the chip 64 may be integrated into one circuit board and may be in physical or electrical or magnetic contact with each other. In FIG. 5, the memory 66 and the logic section 68 are shown separately from each other. However, the memory 66 and the logic section 68 may be integrated into one single integrated circuit.

The tag module 60 and the secondary antenna 40B may be in a package 70, and form a single module. However, in another example, the secondary antenna 40B may be provided separately from the tag module 60 and be located outside the package 70.

FIG. 6 illustrates an example of a coupling among the RFID reader, the master tag 4B and the marker tag 6. In FIG. 6, the primary antenna 62 and the secondary antenna 40B may form a single module in a package (e.g., 70 of FIG. 5) or may be different modules. The RFID reader antenna 52, the primary antenna 62 of the master tag 4B and the secondary antenna 40B of the master tag 4B are in close inductive-coupling so that any energy or data signals transmitted from one antenna is received on the other antennas. In this example, the ID of the master tag 4B represents a group of the marker tags 6.

The marker tags 6 communicate with the master tag 4B through the wired connection system 8A. The secondary antenna 40B of the master tag 4B is conductively coupled with the secondary antenna 30 of the marker tag 6.

In FIG. 6, two marker tags 6 are shown. However, the number of the marker tags 6 is not limited to two and may vary in dependence upon the system design or requirements. In FIG. 6, one master tag 4B is shown. However, the number of the master tag 4B is not limited to one and may vary in dependence upon the system design or requirements. The system may include a plurality of master tags 4B, and the ID of each master tag 4B may represent a different group of marker tags 6.

When the RFID reader 50 outputs RF signals, both of the primary antenna 62 and the secondary antenna 40B receive the RF signals, because of the proximity. The RFID reader 50 acts as an emitter and both of the antennas 40B and 62 in the master tag 4B act as receivers or dual secondary antennas. It is similar to a transformer having three coil-antennas.

When the marker tag 6 is activated through the wired connection system 8A (conductive-coupling), any coding read from the marker tag 6 is transmitted through the wired connection system 8A to the secondary antenna 40B of the master tag 4B. The secondary antenna 40B is coupled to the primary antenna 62 and the RFID reader antenna 52. Thus, the RFID reader 50 receives information read from the marker tag 6. The RFID reader 50 may receive information read from the tag module (60) of the master tag 4B.

The RFID reader 50 communicates with both of the primary antenna 62 and the secondary antenna 40B in the master tag 4B at the same time. After that, the coupling among these antennas depends on a geometric balance, such as the sizes of their coils and distances among the coils. The RFID reader 50 may directly or indirectly communicate with the secondary antenna 40B, the primary antenna 62 or a combination thereof.

The primary 62 may be a large size coil. In this example, the large size coil (primary antenna) 62 grasps the energy generated by the RFID reader 50 and then transfers it to the secondary antenna 40B. The distance between the RFID reader antenna 52 and the primary antenna 62 or the distance between the RFID reader antenna 52 and the secondary antenna 40B may be larger than the distance between the primary antenna 62 and the secondary antenna 40, due to ergonomics/practical reasons.

In FIG. 6, the marker tag 6 communicates with the RFID reader 50 using the master tag 4B through the wired cable (conductive-coupling) 8A. However, the marker tag 6 may directly communicate with the RFID reader 50. In FIG. 6, the master tag 4B is connected to the marker tag 6 through the junction box 14A. However, the master tag 4B may be directly connected to the marker tag 6.

Referring to FIG. 1, the system 2 uses a simultaneous multiple access function, called anti-collision algorithm for operating on a plurality of tags. The tag anti-collision function may be implemented in the tag/reader protocol, allowing all tags to be addressed in a one by one manner, with a time slot system. For example, the system 2 may employ anti-collision mechanism in accordance with the standard ISO 15693-3.

The RFID reader (e.g., 50 of FIGS. 4, 6, and 8) has an RFID tag protocol that defines how to address a particular tag, how to read the ID, or how to read a particular memory block of that particular tag. All that protocol is part of standard tag protocol. All of the tags are activated, however, selective read/write to specific addresses can be achieved.

Figure 7A:
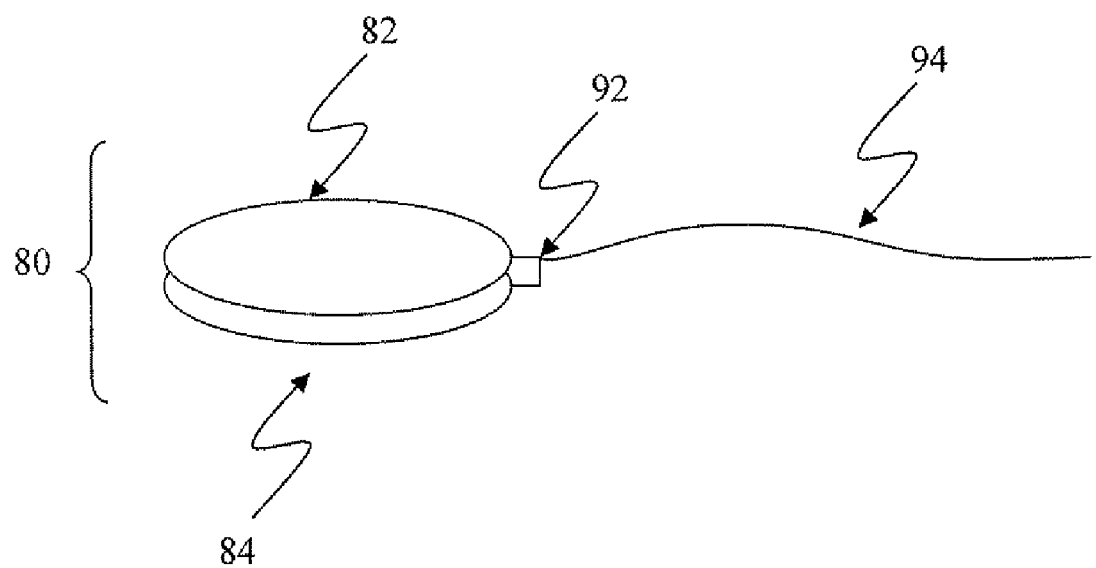
FIG. 7A is a perspective view illustrating an example of the layered structure of the marker tag.
Figure 7B:
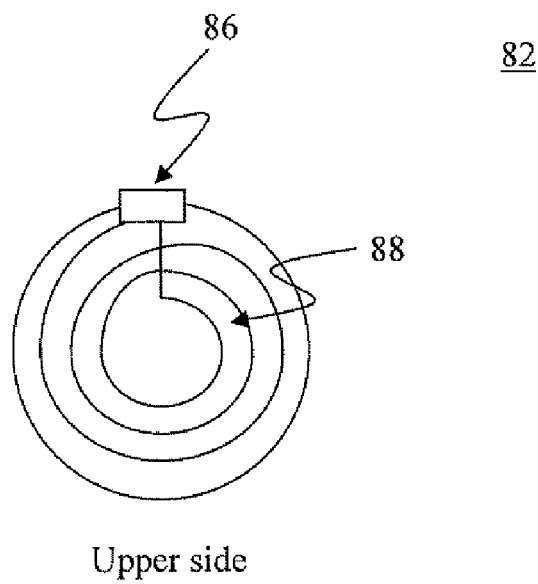
FIG. 7B is a schematic diagram illustrating an example of one layer of FIG. 7A.
Figure 7C:
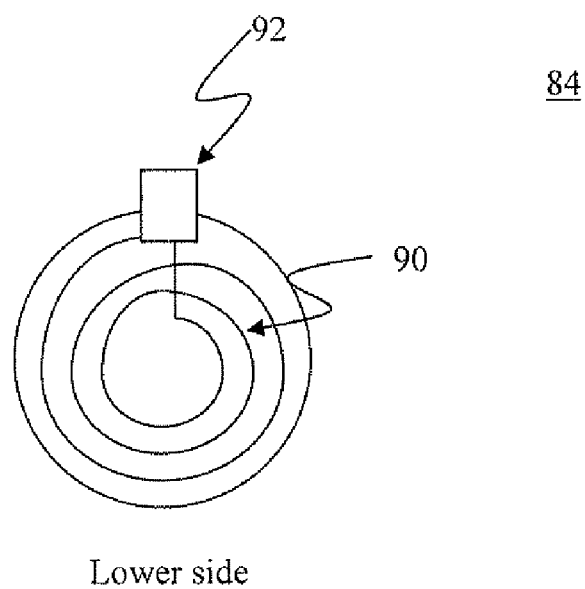
FIG. 7C is a schematic diagram illustrating an example of another layer of FIG. 7A.

FIGS. 7A-7C illustrate an example of the structure of the marker tag 6 of FIG. 1. The tag of FIGS. 7A-7C is made of a multilayer PCB 80. In FIGS. 7A-7C, the PCB 80 has two layers 82 and 84. On one side of the PCB, i.e., one layer 82, there is a chip 86 and a primary coil 88. On the other side of the PCB, i.e., the other layer 84, there is a secondary coil 90 and a wire connexion having a connector 92. The chip 86 corresponds to the chip 24 of FIG. 2. The primary coil 88 corresponds to the primary antenna 22 of FIG. 2. The secondary coil 90 corresponds to the secondary antenna 30 of FIG. 2. The primary coil 88 and the secondary coil 90 are inductively coupled. The secondary coil 90 is connected to a cable through the wire connector 92. The connector 92 corresponds to the connector 32 of FIG. 2. The connector 92 may be a small Surface Mount Device (SMD) type connector, to connect the layer 84 on the PCB to a double wire (e.g., cable 10 of FIG. 1). There are no connexions between the first layer 82 and the second layer 84.

One of ordinary skill in the art will understand that the representation of the primary coil 88 and the secondary coil 90 is schematic only, and the actual configuration of the primary coil 88 and the secondary coil 90 may take on a variety of configurations.

In this example, the interface to the tag is implemented at the connector level, and the tag and its associated secondary antenna is designed on the same unitary component. The marker tag 6 is activated as soon as its connector 92 is linked to the master tag and the HF signal propagates into the wire cable (conductive coupling) through the connector 92.

The master tag 4B of FIG. 5 may have the structure that is same or similar to that of FIGS. 7A-7C. In this example, the primary coil 88 corresponds to the primary antenna 62 of FIG. 5, the chip 86 corresponds to the chip 64 of FIG. 5, the secondary coil 90 corresponds to the secondary antenna 40B of FIG. 5, and the connector 92 corresponds to the connector 42 of FIG. 5.

FIG. 8 illustrates an exemplary scenario applied to the system 2 of FIG. 1. In FIG. 8, the marker tags 6 are placed on items 100 that are to be tracked. The items 100 may be, but not limited to, electronic boards, an assembled unit forming one component, or mechanical parts. The items 100 are in an enclosure 102. The enclosure 102 may be, but not limited to, a sealed electric box, a sealed metal box, or an electrical cabinet, so that RF signals may not pass through the enclosure 102.

The marker tags 6 are connected to the master tag 4 through the wired connection system 8A. The master tag 4 may be the master tag 4A of FIG. 3 or the master tag 4B of FIG. 5. In FIG. 8, the junction box 14A is located in the enclosure 102. However, the junction box 14A may be located outside the enclosure 102.

The master tag 4 is located at a place where it is easily readable by the RFID reader 50. The RFID reader 50 may be a hand-held RFID reader or a fix reading station having RFID reader functions. The RFID reader 50 may communicate with an external computer-based device and use a wired or some other wireless radio protocols to communicate with that computer-based device. The RFID reader 50 may include a user interface, such as a display, input devices and sound devices.

In FIG. 8, the master tag 4 is mounted on the external side of the enclosure 102. In an other example, the master tag 4 may be outside the enclosure 102 and be separated from the enclosure 102. The cable 12 connected to the master tag 4 goes inside the enclosure 102.

The RFID reader 50 sends the RF energy through its antenna 52 to the master tag 4. The master tag 4 transmits the energy to the marker tags 6 through the wired connection system 8A. Once the marker tags 6 have waked up, the RFID reader 50 communicates with the marker tags 6 through the master tag 4, and can address a particular marker tag or a particular memory block of that particular marker according to the tag communication protocol.

In an example, the IDs of all marker tags are scanned and reported under the control of the RFID reader 50. In another example, a particular field stored in the memory (e.g., a memory block 26A, 26B, or 26C of FIG. 2) for each tag is scanned and reported under the control of the RFID reader 50. In a further example, a particular memory field for a particular tag is scanned and reported under the control of the RFID reader 50.

Identification information and particular information associated with the marker tag 6 and the item 100 is collected at the master tag 4. Thus, the information in the marker tag 6 is readable without opening the enclosure 102.

The enclosure 102 may be a shield, electrical cabinet in a train or a vehicle (hereinafter referred to as cabinet 102). The master tag 4 may be placed underneath the train or vehicle or on the side or top of the train or vehicle.

When updating the list of serial numbers of the items 100 in the cabinet 102, all IDs of the marker tags 6 are read through the master tag 4. After performing a particular maintenance operation, the operator of the RFID reader 50 may update a particular field of a marker tag through the master tag 4.

When replacing the item 100, an operator removes the connector (e.g., 32 of FIG. 2, 92 of FIGS. 7A and 7C) from the marker tag 6, and replaces the item 100 with a new item that is fitted with its proper new marker tag. The operator reconnects the connector to the new marker tag. When the system tracks the new item, information on the new marker tag is read.

Figure 9:
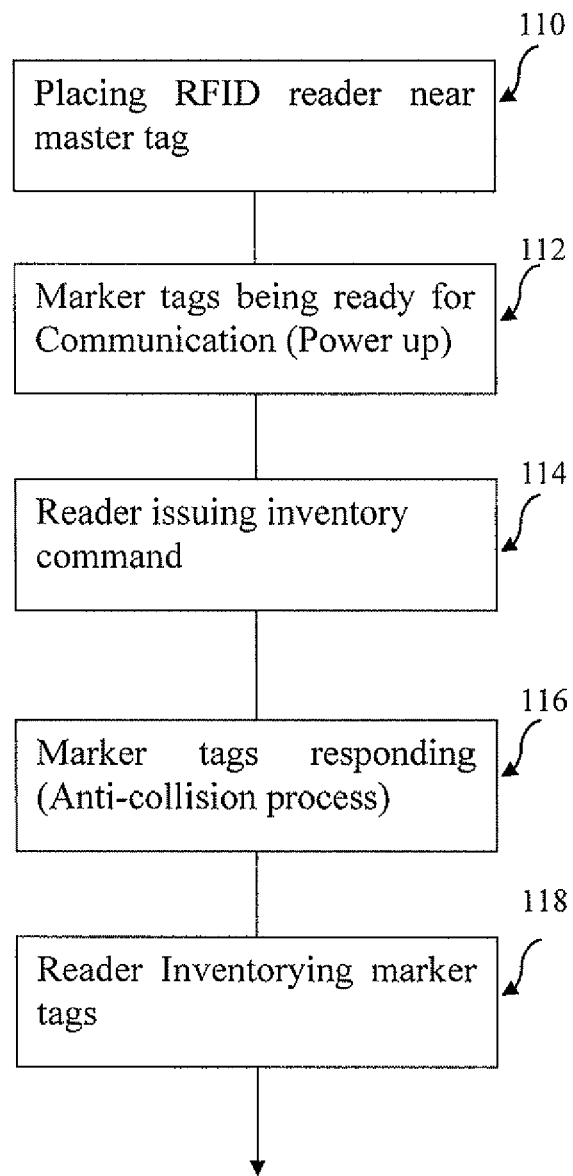
FIG. 9 is a flowchart illustrating an example of a method of operating the monitoring system of FIG. 1.

FIG. 9 illustrates an example of a method of operating the system 2 of FIG. 1. Referring to FIGS. 1 and 9, an RFID reader (e.g., 50 of FIGS. 4, 6 and 8) is placed near the master tag 4 (step 110). The RFID reader sends the RF energy to the master tag 4, which transmits this energy to the marker tags 6 through the wired connection system 8. The marker tags 6 connected to the master tag 4 are powered up and are ready to communicate with the RFID reader (step 112). The RFID reader issues a tag inventory command (step 114). Each marker tag 6 makes a response using its unique ID (step 116). If a collision occurs, the RFID reader detects the collision. The collision is resolved by the anti-collision mechanism. The anti-collision process is implemented until there are no more collisions and the RFID reader identifies all marker tags 6 connected to the master tag 4. Once the RFID reader has inventories all marker tags connected to the master tag 4 (step 118), the RFID reader can access an individual marker tag through the master tag 4 for reading or reading and writing operations.

In FIG. 9, the master tag 4 (e.g., 4B of FIG. 5) may respond to the RFID reader in accordance with the anti-collision mechanism, using its unique ID.

In FIG. 9, the marker tags 6 are operated through the master tag 4. However, in another example, the marker tags 6 may directly respond to the RFID reader. In this example, the marker tag 6 is placed within the RF field of the RFID reader. The marker tag 6 is powered up by signals directly received from the RFID reader. The RFID reader directly obtains the ID of the marker tag 6.

Figure 10:
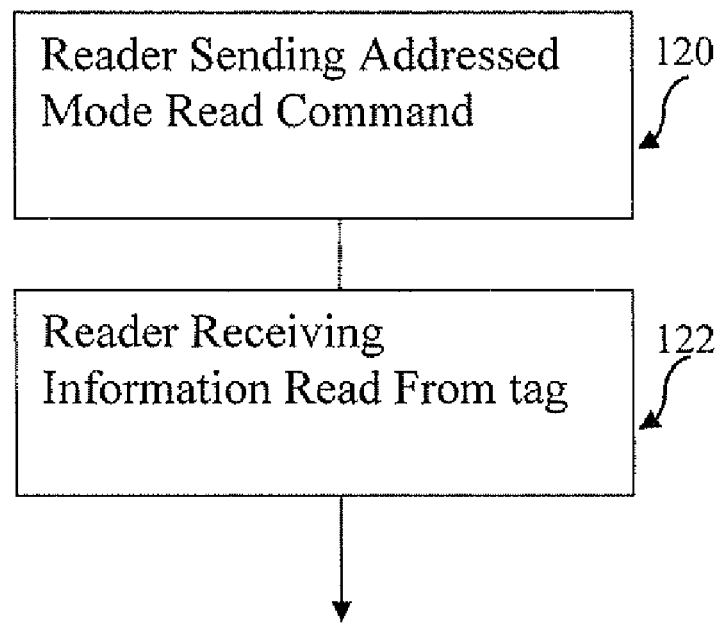
FIG. 10 is a flowchart illustrating an example of a method for read mode operation for the monitoring system of FIG. 1.

FIG. 10 illustrates an example of a method for read mode operation for the system 2 of FIG. 1. Referring to FIGS. 1 and 10, the RFID reader (e.g., 50 of FIGS. 4, 6 and 8) has the IDs of the marker tags 6. The master tag 4 is within the RF field of the RFID reader. The RFID reader sends an addressed mode read command to a particular marker tag 6, and a particular memory block in the particular marker tag 6 (step 120). The unique ID allocated to each marker tag is used to access that particular marker tag. The RFID reader receives through the master tag 4 information read from the particular memory block in the particular marker tag 6 (step 122). The addressed mode read command is, for example, based on ISO 15693-3 tag protocol.

In FIG. 10, the RFID reader may read information from the master tag 4 (e.g., 4B of FIG. 5), using the tag's unique ID.

In FIG. 10, the marker tags 6 are operated through the master tag 4. However, in another example, the RFID reader may directly read information from the marker tag 6. In this example, the marker tag 6 is placed within the RF field of the RFID reader.

Figure 11:
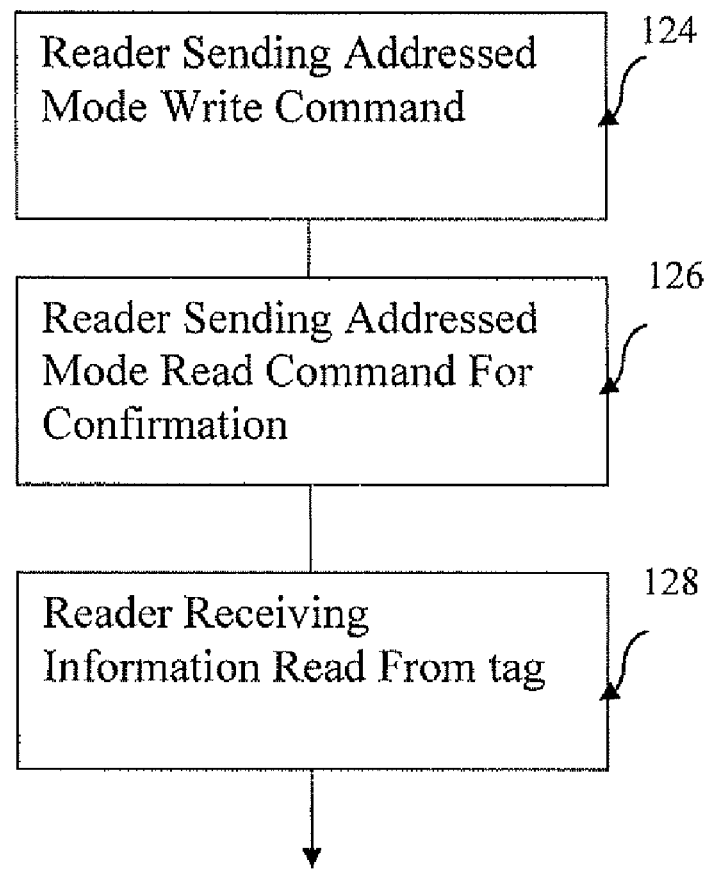
FIG. 11 is a flowchart illustrating an example of a method for read mode operation for the monitoring system of FIG. 1.

FIG. 11 illustrates an example of a method for write mode operation for the system 2 of FIG. 1. Referring to FIGS. 1 and 11, the RFID reader (e.g., 50 of FIGS. 4, 6 and 8) has the IDs of the marker tags 6. The master tag 4 is within the RF field of the RFID reader. The RFID reader sends an addressed mode write command to a particular marker tag, and a particular memory block in the particular marker tag 6 (step 124). The unique ID allocated to each marker tag is used to access a particular marker tag. For confirmation, the RFID reader sends an addressed mode read command to check that the reading has been completed (step 126), similar to the step 120 of FIG. 10. The RFID reader receives through the master tag 4 information read from the particular memory block in the particular marker tag 6 (step 128), similar to the step 122 of FIG. 10. The addressed mode read command and the addressed mode write command are, for example, based on ISO 15693-3 tag protocol.

In FIG. 11, the RFID reader may implement the write and read operation on the master tag 4 (e.g., 4B of FIG. 5), using the tag's unique ID.

In FIG. 11, the marker tags 6 are operated through the master tag 4. However, in another example, the RFID reader may directly write information on the marker tag 6. In this example, the marker tag 6 is placed within the RF field of the RFID reader.

Figure 12:
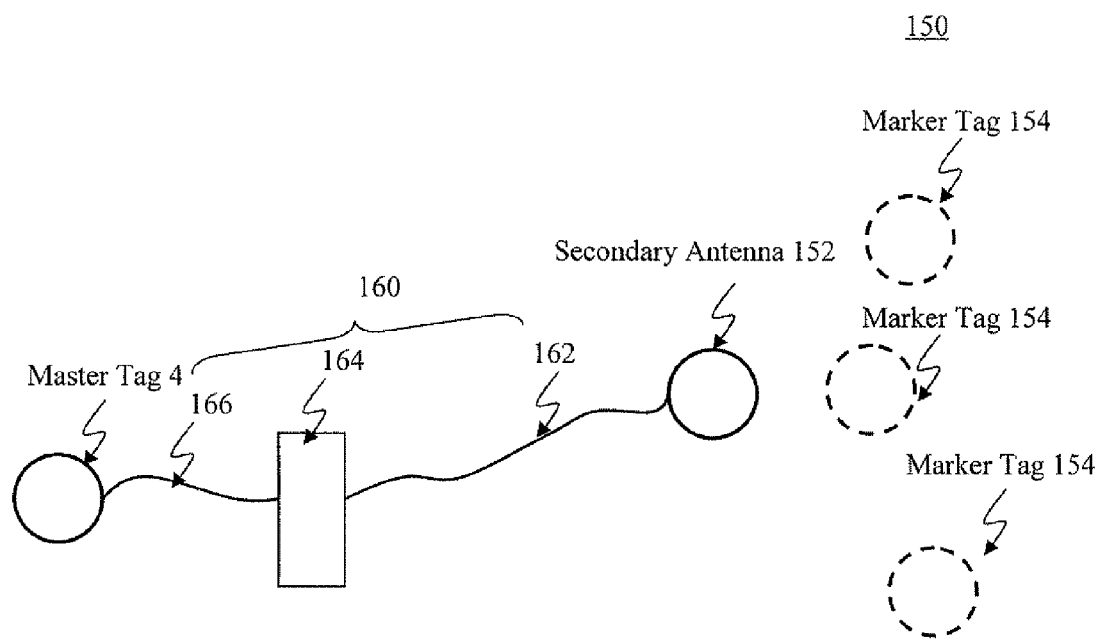
FIG. 12 is a schematic diagram illustrating an example of a monitoring system in accordance with the present disclosure.

FIG. 12 illustrates an example of a monitoring system 150 in accordance with one of various embodiments of the present disclosure. The system 150 includes a secondary antenna 152 for one or more than one marker tag 154, and a wired connection system 160 for connecting the secondary antenna 152 and the master tag 4. The secondary antenna 152 may be a coil antenna. The marker tag 154 is applied to an item that is to be traced. In the description, "154" may represent "(individual) marker tag" or "(a group of) marker tags".

The marker tag 154 may be same or similar to the tag module 20 of FIG. 2. The marker tag 154 contains a primary antenna (e.g., 156 of FIG. 13) and RF tag functions. The marker tag 154 contains readable information or readable/writeable information in its memory block(s), e.g., a unique ID. The marker tag 154 does not include a secondary antenna.

The secondary antenna 152 may be same or similar to the secondary antenna 30 of FIG. 2. The secondary antenna 152 and the primary antenna (e.g., 156 of FIG. 13) of each marker tag 154 are coupled by inductive-coupling.

The wired connection system 160 includes a cable 162 that is connected to the secondary antenna 152. The cable 162 may be detachably connected to the secondary antenna 152. The wired connection system 160 may include a connection module 164 for connecting the cable 162 to the master tag 4. The connection module 164 may be same or similar to the connection module 14 of FIG. 1. The connection module 164 may be a junction box (e.g., 14A of FIGS. 4, 6 and 8). The wired connection system 160 may further include a cable 166 for connecting the master tag 4 to the cable 162. In another example, the master tag 4 may be directly wired-connected to the secondary antenna 152 without using the connection module 164. The cable 162 may be a twisted pair cable or a coax cable. The cable 166 may be a twisted pair cable or a coax cable. The wired connection system 160 may be same or similar to the wired connection system 8 of FIG. 1 or 8A of FIGS. 4, 6 and 8.

In FIG. 12, one master tag 4 is shown. However, the number of the master tag 4 is not limited to one and may vary in dependence upon the system design or requirements. In FIG. 12, one secondary antenna 152 is shown. However, the number of the secondary antenna 152 is not limited to one and may vary in dependence upon the system design or requirements. In another example, one master tag 4 may be connected to a plurality of secondary antennas 152. In FIG. 12, three marker tags 154 are shown. However, these marker tags 154 are representative only. In FIG. 12, one cable 162 is shown. However, the number of the cables 162 is not limited to one and depends on the number of the secondary antennas 152. A plurality of cables 162 may be connected to the master tag 4 through the connection module 164.

The system 150 may include a plurality of secondary antennas 152 and a plurality of master tags 4, and each master tag 4 may represent one secondary antenna 152 or a group of secondary antennas 152.

Figure 13:
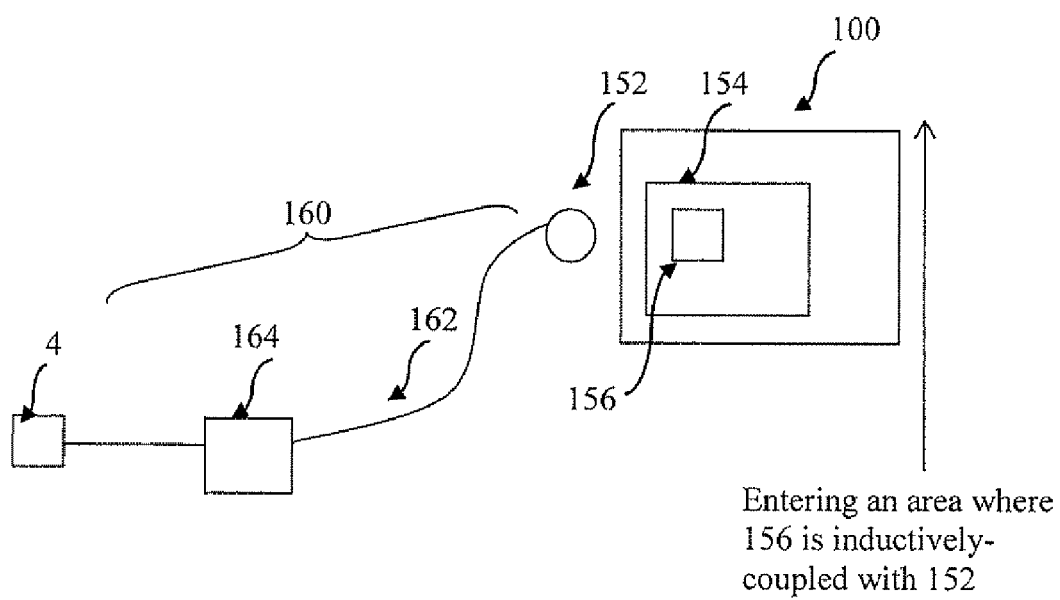
FIG. 13 is a schematic diagram illustrating an exemplary scenario applied to the system of FIG. 12.

FIG. 13 illustrates an exemplary scenario applied to the system 150 of FIG. 12. The marker tag 154 is allocated to an item 100 that is to be traced. The marker tag 154 is, for example, placed on a frame of the item 100. The secondary antenna 152 is located at a particular position/location. The item 100 is moved into a certain area associated with the particular position of the secondary antenna 152 when it is to be tracked. When the item 100 approaches and moves into that area, a link between the secondary antenna 152 and the marker tag 154 is established. The marker tag 154 is seen by the secondary antenna 152 (inductive-coupling).

The marker tag 154 is, for example, a passive tag. The marker tag 154 is energized by signals that are received through the wired connection system 160 or the secondary antenna 152, or received directly at its antenna 156.

The marker tag 154 is an RFID read tag or an RFID read-write tag. An RFID reader (e.g., 50, FIGS. 4, 6 and 8) may implement the operation processes on the marker tag 154, similar to those of FIGS. 9-11. The RFID reader accesses the marker tag 154 through the master tag 4. The RFID reader may directly operate on the marker tags 154. A memory block in the marker tag 154 may be read or read/written by the RFID reader using tag protocols. A particular memory block in a particular marker tag 154 may be read or read/written by the RFID reader using tag protocols (e.g., ISO 15693-3).

In the various embodiments, the marker tag (i.e., 6 of FIG. 2, 154 of FIG. 13) communicates with RFID readers using the secondary antenna (i.e., 30 of FIG. 2, 152 of FIG. 13) where the secondary antenna is directly connected to the wired connection system (i.e., 8 of FIG. 2, 160 of FIG. 13). In one of various embodiments, the tag antenna of the marker tag is directly connected to the wired connection system as shown in FIG. 14.

Figure 14:
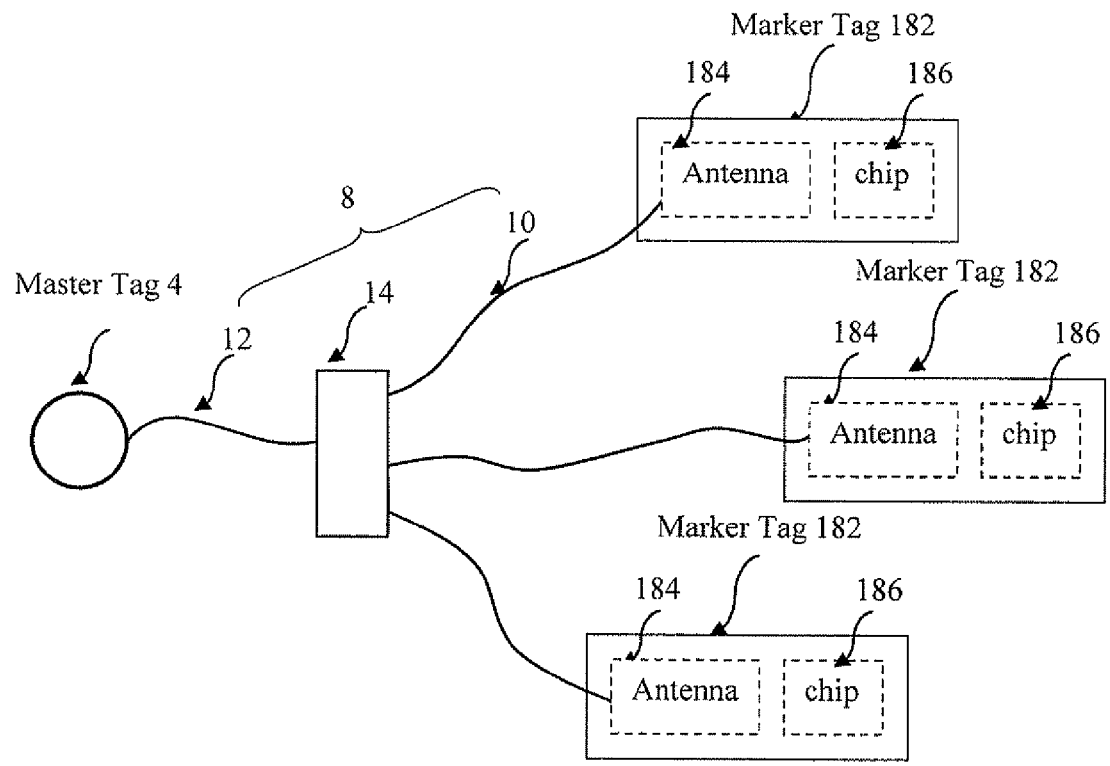
FIG. 14 is a schematic diagram illustrating an example of a monitoring system in accordance with the present disclosure.

FIG. 14 illustrates an example of a monitoring system 180 in accordance with one of various embodiments of the present disclosure. The system 180 includes a group of marker tags 182. The marker tag 182 includes a tag module containing a unique ID. The marker tag 182 may be an RFID read tag or an RFID read/write tag. The marker tag 182 may employ a standard design of RFID circuit and operate in accordance with ISO tag standards (e.g., ISO 15693 protocols). The marker tag 182 is applied to an item that is to be traced.

Each marker tag 182 has a tag antenna 184 and a chip 186. The tag antenna 184 and the chip 186 form a single tag module. The marker tag 182 is accessed through the tag antenna 184. The tag antenna 184 may be a coil antenna. The chip 186 has a unique address and can be addressed uniquely through a tag protocol (e.g., ISO 15693 protocols).

The tag antenna 184 is physically connected to the cable 10. The tag antenna 184 may be detachably connected to the cable 10 via a connector similar to the connector 32 of FIG. 3. The marker tags 182 communicate with RFID readers (e.g., 50 of FIGS. 4, 6, and 8) via the wired connection system 8. The marker tags 182 are readable and writable via the master tag 4. The marker tags 182 are controlled through the master tag 4.

In FIG. 14, the tag antenna 184 and the chip 186 are shown separately. However, the tag antenna 184 and the chip 186 may be integrated into one circuit board and may be in physical or electrical or magnetic contact with each other.

The marker tag 182 may be same or similar to the tag module 20 of FIG. 2. The tag antenna 184 may be same or similar to the primary antenna 22 of FIG. 2. The chip 186 may be same or similar to the chip 24 of FIG. 2, and includes a logic circuit and a memory having one or more than one memory block. A particular memory block in a particular marker tag 154 may be read or read/written by the RFID reader using tag protocols (e.g., ISO 15693-3). The system 180 of FIG. 14 may be operated in accordance with the steps of FIGS. 9-11.

The marker tag 182 is a passive RFID tag. The marker tag 182 derives its energy based on signals received through the cable 10 or signals directly received by the tag antenna 184.

In FIG. 14, three marker tags 182 are shown. However, the number of the marker tags 182 is not limited to three and may vary in dependence upon the system design or requirements. In FIG. 14, one master tag 4 is shown. However, the number of the master tag 4 is not limited to one and may vary in dependence upon the system design or requirements. In a further example, one master tag 4 may be connected to one marker tag 182 in a one to one relationship.

The master tag 4 in the various embodiments may be same or similar to the marker tag 182. The tag antenna of the master tag 4 may be directly connected to the wired connection system (i.e., 8 of FIGS. 1 and 14, 160 of FIG. 12). The wired connection system 8 of FIGS. 1 and 14 may be same or similar to the wired connection system 160 of FIG. 12. The system 180 may include the wired connection system 160 of FIG. 12.

The present disclosure has been described with regard to various embodiments. However, it will be apparent to persons skilled in the art that a number of variations and modifications can be made without departing from the scope of this disclosure as defined in the claims.

What is claimed is:

1. A system for monitoring an item, comprising:
a marker tag allocated to an item, the marker tag being a Radio Frequency Identification (RFID) tag including:
a tag module including tag information having a unique identification (ID) and a first antenna operable by a RFID reader; and
a second antenna for inductively coupling to the first antenna and coupling to a master tag for accessing the marker tag, the master tag being operable in a Radio Frequency (RF) field of the RFID reader;
a connector; and
a wired connection system including:
a first cable, the connector detachably coupling the marker tag to the first cable such that the marker tag is replaceable with another marker tag; and
a coupler for coupling the first cable to the master tag, the second antenna operatively coupling to the master tag via the wired connection system such that the tag module is operated by the RFID reader via the master tag.

2. The system as claimed in claim 1, wherein a data signal, energy or a combination thereof is transferable from the RFID reader to tag the tag module through the conductive coupling.

3. The system as claimed in claim 2, wherein the tag module comprises:
a passive tag module.

4. The system as claimed in claim 1, wherein the marker tag is a read/write RFID tag, data being transferred from the RFID reader to the marker tag via the master tag and the cable, and being written in the tag module.

5. The system as claimed in claim 1, wherein the tag module is operable in accordance with an anti-collision mechanism.

6. The system as claimed in claim 1, wherein the coupler comprises:
a second cable being connected to the master tag.

7. The system as claimed in claim 6, wherein the first cable is allocated to each of a plurality of marker tags, each having the tag module, and wherein the coupler comprises:
a junction box for connecting each first cable to the cable.

8. The system as claimed in claim 6, wherein the master tag comprises:
a first antenna, conductively coupled with the second cable and being accessible by the RFID reader.

9. The system as claimed in claim 8, wherein the master tag is an RFID tag and comprises:
a read tag module or a read/write tag module operable by the RFID reader and having a second antenna, and wherein the second antenna is inductively coupled with the first antenna of the master tag and is accessible by the RFID reader.

10. The system as claimed in claim 1, wherein the RFID reader is in a fixed RFID reading equipment, and wherein the master tag is readable with the RFID reader by locating the master tag in the RF field of the RFID reader.

11. The system as claimed in claim 1, wherein the RFID reader is a handheld RFID reader.

12. The system as claimed in claim 1, wherein the master tag is an RFID tag and operable in accordance with an anti-collision mechanism.

13. The system as claimed in claim 1, wherein the tag module and the second antenna form a single module.

14. The system as claimed in claim 13, wherein the single module comprises a layered structure including a first layer and a second layer, and the first layer comprises the first antenna and the second layer comprises the second antenna.

15. The system as claimed in claim 1, wherein the marker tag is uniquely addressable when operated by the RFID reader via the master tag.

16. A system for monitoring an item, comprising:
a master tag for accessing a marker tag allocated to an item, the master tag being operable in a Radio Frequency (RF) field of a Radio Frequency Identification (RFID) reader and including a connector, the marker tag being an RFID tag operable by the RFID reader and including a tag module tag information; and
a wired connection system including:
a first cable, the connector detachably coupling the first cable to the master tag such that the master tag is replaceable with another master tag; and
a coupler for coupling the first cable to the marker tag such that the tag module is operated by the RFID reader via the master tag.

17. The system as claimed in claim 16, wherein the coupler comprises:
a second cable being connected to the marker tag.

18. The system as claimed in claim 17, wherein the second cable is allocated to each of a plurality of marker tags, each having the tag module, and wherein the coupler comprises:
a junction box for connecting each second cable to the first cable.

19. The system as claimed in claim 16, wherein the RFID reader is in a fixed RFID reading equipment, and wherein the tag module is readable with the RFID reader by locating the item with the marker tag in a position associated with the second antenna.

20. The system as claimed in claim 16, wherein the RFID reader is a handheld RFID reader.

21. The system as claimed in claim 16, wherein a data signal, energy or a combination thereof is transferable from the RFID reader to the marker tag the tag module through the conductive coupling.

22. The system as claimed in claim 16, wherein the marker tag is a read/write RFID tag, data being transferred from the RFID reader to the marker tag via the master tag and the wired connection system and being written in the tag module of the marker tag.

23. The system as claimed in claim 16, wherein the tag module is operable in accordance with an anti-collision mechanism.

24. The system as claimed in claim 16, wherein the marker tag the tag module comprises:
a passive tag module.

25. The system as claimed in claim 16, wherein the master tag comprises:
a first antenna conductively coupled with the first cable and being accessible by the RFID reader.

26. The system as claimed in claim 25, wherein the master tag is an RFID tag and comprises:
a read tag module or a read/write tag module operable by the RFID reader and having a second antenna, and wherein the second antenna is inductively coupled with the first antenna of the master tag and is accessible by the RFID reader.

27. The system as claimed in claim 16, wherein the master tag is an RFID tag and operable in accordance with an anti-collision mechanism.

28. The system as claimed in claim 16, wherein the marker tag is operable by the RFID reader through a primary antenna.

29. The system as claimed in claim 28, wherein the coupler comprises:
   a secondary antenna for inductively coupling to the primary antenna such that the tag module in the marker tag is operated by the RFID reader via the master tag.

30. The system as claimed in claim 16, wherein the marker tag is uniquely addressable when operated by the RFID reader via the master tag.

31. A system for monitoring an item, comprising:
   a first cable allocated to a master tag for accessing, by the master tag, at least one marker tag, the master tag being operable in a Radio Frequency field of a Radio Frequency Identification (RFID) reader;
   a first connector detachably coupling the first cable to the master tag such that the master tag is replaceable with another master tag;
   each of at least one second cable allocated to a corresponding one of each of at least one marker tag, each of the at least one marker tag being an RFID tag allocated to an item to be tracked;
   each of at least one second connector detachably coupling each of the at least one of the second cable to each of the at least one marker tag such that a marker tag is replaceable with another marker tag; and
   a coupler for coupling the second cable to the first cable such that the marker tag is readable and/or writable via the master tag.

\* \* \* \* \*

UNITED STATES PATENT AND TRADEMARK OFFICE
CERTIFICATE OF CORRECTION

PATENT NO. : 7,961,097 B2  
APPLICATION NO. : 11/608152  
DATED : June 14, 2011  
INVENTOR(S) : Porte et al.

Page 1 of 1

It is certified that error appears in the above-identified patent and that said Letters Patent is hereby corrected as shown below:

In the Specification:

In Column 3, Line 24, delete "14 Å" and insert -- 14A --, therefor.

In Column 9, Line 16, delete "an other" and insert -- another --, therefor.

In the Claims:

In Column 13, Line 33, in Claim 2, delete "to tag" and insert -- to --, therefor.

In Column 13, Line 50, in Claim 7, delete "cable." and insert -- second cable. --, therefor.

In Column 14, Line 44, in Claim 21, delete "to the marker tag" and insert -- to --, therefor.

In Column 14, Lines 54-55, in Claim 24, delete "the marker tag the" and insert -- the --, therefor.

Signed and Sealed this  
Seventeenth Day of September, 2013

Teresa Stanek Rea  
*Deputy Director of the United States Patent and Trademark Office*